US010127312B1

(12) United States Patent
Lewis et al.

(10) Patent No.: US 10,127,312 B1
(45) Date of Patent: Nov. 13, 2018

(54) MUTABLE LIST RESILIENT INDEX FOR CANONICAL ADDRESSES OF VARIABLE PLAYLISTS

(71) Applicant: Google Inc., Mountain View, CA (US)

(72) Inventors: Justin Lewis, Marina del Rey, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 594 days.

(21) Appl. No.: 14/490,585

(22) Filed: Sep. 18, 2014

Related U.S. Application Data

(60) Provisional application No. 61/879,602, filed on Sep. 18, 2013.

(51) Int. Cl.
G06F 17/30 (2006.01)
(52) U.S. Cl.
CPC ........ G06F 17/30858 (2013.01); G06F 17/30 (2013.01)

(58) Field of Classification Search
CPC .................... G06F 17/30858; G06F 17/30823
USPC ......................................................... 707/769
See application file for complete search history.

(56) References Cited

U.S. PATENT DOCUMENTS

| 2006/0143236 | A1* | 6/2006 | Wu ................... G06F 17/30053 |
| 2011/0247035 | A1* | 10/2011 | Adimatyam ....... H04N 5/44543 725/39 |
| 2013/0227038 | A1* | 8/2013 | Rich ................. H04L 29/06476 709/206 |

* cited by examiner

*Primary Examiner* — Thu-Nguyet Le
(74) *Attorney, Agent, or Firm* — Lowenstein Sandler LLP

(57) ABSTRACT

A method for adding a media item to a playlist may include identifying a media item instance to be added to a playlist, and creating a playlist key for the media item instance, where the playlist key uniquely identifies the media item instance in the playlist. The method may further include storing the playlist key of the media item instance, an identifier of a media item associated with the media item instance and an identifier of the playlist in a data structure associated with the playlist.

20 Claims, 7 Drawing Sheets

| Playlist Key (idx) | Playlist Identifier | User Identifier (user_id) | Video Identifier (video_id) | Video Type | Time_Created | Position in Playlist (index_ID) | Status |
|---|---|---|---|---|---|---|---|
| 1 | TLrlOETbMKS5k | John Smith | Video A | Video | 02/02/2014 10:45am | 1 | Active |
| 2 | TLrlOETbMKS5k | John Smith | Video B | Video | 02/02/2014 10:55am | 4 | Active |
| 3 | TLrlOETbMKS5k | John Smith | Video C | Video | 02/02/2014 10:56am | 3 | Active |
| 4 | TLrlOETbMKS5k | John Smith | Video D | Video | 02/02/2014 10:57am | 2 | Active |
| 5 | TLrlOETbMKS5k | John Smith | Video E | Video | 02/02/2014 10:59am | 5 | Active |

FIG. 2A

MUTABLE LIST RESILIENT INDEX FOR CANONICAL ADDRESSES OF VARIABLE PLAYLISTS

RELATED APPLICATION

This application claims priority under 35 U.S.C. § 119(e) to U.S. Provisional Application 61/879,602, filed on Sep. 18, 2013 which is incorporated by reference herein.

TECHNICAL FIELD

The present disclosure relates to playlists and, more particularly, to dynamically creating and sharing media item playlists.

BACKGROUND

On the Internet, content sharing platforms or services allow users to upload, view, and share content, such as video content, image content, audio content, and so on. The shared content may include content from professional content creators, e.g., movie clips, TV clips, and music videos, as well as content from amateur content creators, e.g., video blogging and short original videos. Users of content sharing platforms can also create playlists of content items and share these playlists with other users. Many social networks also include a content sharing aspect that allows users to upload, view, and share content. However, currently content sharing experience of users with respect to playlist sharing is typically very minimal.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

A method and system for dynamically creating playlists is described. The method includes identifying a media item instance to be added to a playlist, and creating a playlist key of the media item instance. The playlist key uniquely identifies the media item instance in the playlist. The method further includes storing the playlist key of the media item instance, an identifier of a media item associated with the media item instance and an identifier of the playlist in a data structure associated with the playlist, wherein the playlist key, the identifier of the media item and the identifier of the playlist represent a globally unique key of the media item instance.

In one implementation, the playlist key of the media item instance indicates a number of other media item instances added to the playlist prior to the media item instance. In one implementation, the method further includes creating the globally unique key of the media item instance by cryptographically combining or concatenating the playlist key of the media item instance, the identifier of the media item instance, and the identifier of the playlist. In one implementation, storing the globally unique key of the media item instance comprises adding an entry for the media item instance to the data structure, where the entry for the media item instances comprises the globally unique key. In one implementation, the entry for the media item instance further comprises additional information about the media item instance. The additional information can comprise a position of the media item instance in the playlist. In one implementation, a request to remove the media item instance from the playlist is received, and the entry for the media item instance is deactivated in the data structure. In one implementation, when a request to view the playlist is received from a user, the data structure associated with the playlist is accessed and the playlist is provided for presentation to a user. The order of current media items in the playlist is defined based on position values in respective entries of the data structure. In one implementation, the media items of the playlist are sequentially streamed to a user device. In one implementation, the position of the media item currently presented on the user device is graphically illustrated in the playlist.

A method for sharing a playlist is also described. The method includes receiving a request for a media item instance shared using a globally unique key of the media item instance, and determining, based on the globally unique key of the requested media item instance, whether the requested media item instance is associated with a playlist. The method further includes: upon determining that the requested media item instance is associated with the playlist, accessing a data structure associated with the playlist, locating an entry for the requested media item instance in the data structure using the globally unique key, determining a position of the requested media item instance in the playlist, and causing the requested media item instance to be presented on a user device with the playlist, and to visually illustrate the position of the requested media item instance in the playlist.

In one implementation, if the requested media item instance is not associated with the playlist, the requested media item instance is caused to play on the user device without presenting the playlist. In one implementation, determining whether the requested media item instance is associated with the playlist comprises parsing the globally unique key to obtain a playlist identifier. In one implementation, the position of the requested media item instance in the playlist is graphically illustrated on the user device using at least one of a visual indicator or highlighting of the requested media item instance. In one implementation, the data structure comprises entries for multiple media item instances associated with the same media item. In one implementation, the globally unique key comprises an identifier of a media item of the requested media item instance, a playlist key of the requested media item instance, and an identifier of the playlist. In one implementation, the playlist key of the requested media item instance, the identifier of the media item and the identifier of the playlist are cryptographically combined or concatenated to produce the globally unique key. In one implementation, the position of the requested media item instance in the playlist is determined using the entry for the requested media item instance in the data structure. In one implementation, when the playback of the requested media item instance on the user device has concluded, a second media item instance associated with the playlist identifier is automatically caused to be played on the user device and the position of the second media item instance is caused to be visually illustrated within the playlist, where the second media item instance immediately follows the requested media item instance in the playlist.

In additional implementations, computing devices for performing the operations of the above described implementations are also implemented. Additionally, in implementations of the disclosure, a computer readable storage media may store instructions for performing the operations of the implementations described herein.

BRIEF DESCRIPTION OF THE DRAWINGS

The present disclosure will be understood more fully from the detailed description give below and from the accompanying drawings of various implementations of the disclosure.

FIG. 2A is an example playlist data structure, in accordance with some implementations.

DESCRIPTION OF EMBODIMENTS

Figure 1:
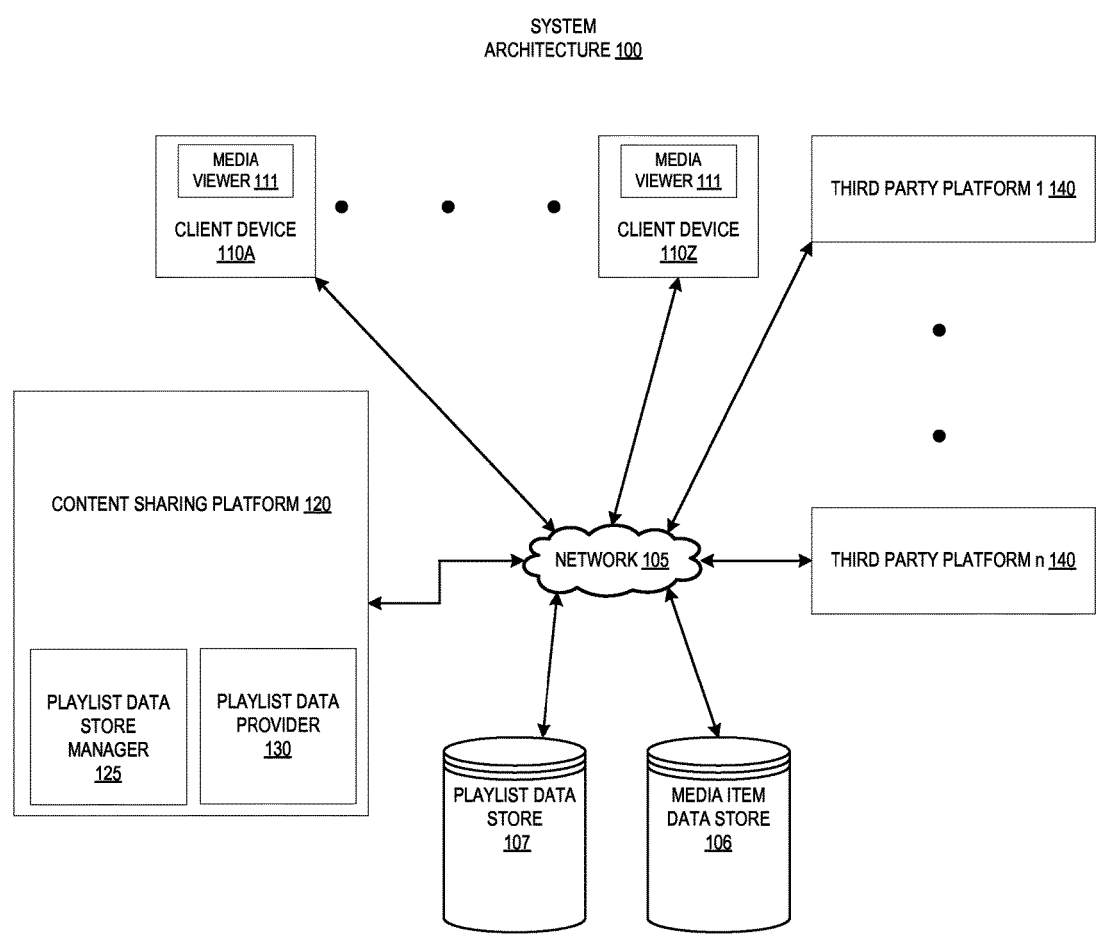
FIG. 1 illustrates an example system architecture, in accordance with some implementations of the present disclosure

Content sharing services usually allow a user to view a particular media item from a playlist and see a list of other media items from the playlist next to the particular media item. However, if a user of a content sharing service wants to share the particular media item from the playlist with another user of the content sharing service, the shared media item is typically presented by itself without presenting the playlist that includes the shared media item. Content sharing activity of users on social networks with respect to playlists may also be very minimal. For example, an embedded player in a social network, mobile application or web page user interface (UI) typically only presents a shared video, without presenting a playlist from which the shared video was originally selected.

A playlist can change dynamically (e.g., videos can be added to or removed from the playlist) and can include multiple copies or instances of a media item (e.g., a playlist can reference several different clips of a video). Some content sharing services such as music sharing services allow users to share media items from various playlists. However, some of these music sharing services use playlists that cannot change once generated, and some other music sharing services simply share a list of media item identifiers or a playlist identifier but not the position of a media item in the playlist. In another example, photo sharing sites allow users to share albums which can represent static playlists. However, albums can only cover certain types of playlists because an album usually does not include multiple copies of a photo.

Aspects of the present disclosure address the above and other deficiencies by providing a mechanism for sharing a media item in the context of a dynamic playlist from which the shared media item was originally selected. In the dynamic playlist, media items can be dynamically added or removed from the playlist, and the playlist can include multiple instances of the same media item (e.g., when a playlist references several different clips or copies of a video). In particular, aspects of the present disclosure provide a method of uniquely identifying a dynamic playlist and a specific higher priority element of that playlist as elements to be represented in a web page or a document rendered by a mobile application. The above unique identification can be resilient to modification of the list (including having the desired media item removed from the playlist entirely). In some implementations, the above unique identification is used as part of a discoverable URL for a specific video in a playlist. When a visitor clicks this URL (e.g., on the website or a mobile app UI), the visitor is presented with the correct instance of a video in the playlist.

The present disclosure often references videos for simplicity and brevity. However, the teaching of the present disclosure are applied to media item instances generally and can be applied to various types of content or media item instances, including for example, video, audio, text, images, program instructions, etc.

FIG. 1 illustrates example system architecture 100, in accordance with one implementation of the present disclosure. The system architecture 100 includes one or more client devices 110A through 110Z, one or more networks 105, one or more playlist data stores 107, one or more media item data stores 106, a content sharing platform (e.g., a video platform) 120, and one or more third party platforms 140. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the media item data store 106 or the playlist data store 107 may be a memory (e.g., random access memory), a cache, a drive (e.g., a hard drive), a flash drive, a database system, or another type of component or device capable of storing data. The media item data store 106 or the playlist data store 107 may also include multiple storage components (e.g., multiple drives or multiple databases) that may also span multiple computing devices (e.g., multiple server computers).

The client devices 110A-Z can include devices, such as, cellular telephones, personal digital assistants (PDAs), portable media players, netbooks, laptop computers, electronic book readers, tablet computers, desktop computers, set-top boxes, gaming consoles, televisions, and the like. The individual client devices 110A-Z can include a media view 111. In one implementation, the media viewers 111 are applications that allow users to view content, such as images, videos, documents (e.g., web pages), etc. For example, the media view 111 may be a web browser that can access, retrieve, present, and/or navigate content (e.g., web pages such as Hyper Text Markup Language (HTML) pages, digital media items, etc.) served by a web server. The media viewer 111 can render, display, and/or present the media item content (e.g., a web page, a media viewer) to a user. The media viewer 111 may also display an embedded media player (e.g., a Flash® player or an HTML5 player) that is embedded in a document (e.g., a web page). In another example, the media viewers 111 may be standalone applications (e.g., mobile applications, desktop applications, gaming consoles applications, television applications, etc.) that allow users to view digital media items (e.g., digital videos, digital images, electronic books, etc.). The media viewers 111 can be provided to client devices 110A through 110Z by the content sharing platform 120. For example, the media viewers 111 may be embedded media players that are embedded in documents (e.g., web pages) provided by the content sharing platform 120. In another example, the media viewers 111 may be standalone applications that are pre-installed on the client devices 110A through 110Z.

The content sharing platform 120 can include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, edit, recommend, share, rate, and/or comment on media items. The content sharing platform 120 can provide a website (e.g., one or more webpages) and/or one or more applications that may be used to provide a user with access to the media items.

The content sharing platform 120 may provide media items and associated playlists to third party platforms 140 or client devices 110A-Z. A playlist can be referred to as a list of media items that are automatically presented to a user one after another. Examples of a media item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A media item may be consumed via the Internet and/or via a mobile device application. For brevity and simplicity, an online video (also hereinafter referred to as a video) is used as an example of a media item throughout this document. As used herein, "media," media item," "online media item," "digital media," and a "digital media item" can include an electronic file that can be executed or loaded using software, firmware or hardware configured to present the digital media item to an entity.

In one aspect, media item data store 106 comprises media item content files such as video (.MP3, .AVI, .MPG, .WMV, .MOV, or the like), audio (.MP3, .WAV, or the like), or image (.TIF, .JPG, .PNG, .GIF, or the like). The media item data store 106 provides the content sharing platform 120 with media content necessary to fill user requests. The media item data store 106 may also include user information, preference, settings, or other information ancillary to proving media item content to the content sharing platform 120. Media item data store 106 is communicatively coupled to the content sharing platform 120 over the network 105. In some aspects, the media item data store 106 may include a playlist data store 107 or may be communicatively coupled to playlist data store 107.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

The third party platform 140 may be one or more computing devices (e.g., servers), data stores, networks, software components, and/or hardware components that may be used to allow users to connect to, share information, and/or interact with each other. The third party platform 140 can be, for example, a social network (SN) that may present to a user a listing (e.g., activity feed, news feed, stream, wall, etc.) of objects (such as posts, content items (e.g., video, images, audio, etc.), status updates, favorability indications, tags, messages, and so on) generated by other users of the social network. The third party platform 140 may also include a content sharing aspect that allow users to upload, view, tag, and share content, such as text content, video content, image content, audio content, and so on. Other users of the third party platform 140 may comment on the shared content, discover new content, locate updates, share content, and otherwise interact with the provided content.

In one implementation, the content sharing platform 120 may be integrated with the third party platform 140. For example, the third party platform 140 may use the content sharing platform 120 to allow users to upload and/or share content. In another implementation, the third party platform 140 may be separate from the content sharing platform 120. In one implementation, the third party platform 140 can be a mobile platform to allow users to connect to, share information, and/or interact with each other using one or more mobile device, smart phones, tablet devices, and other mobile communication devices that allow users to communicate over a telecommunications network. For example, the mobile platform may enable telephony communication, Short Message Service (SMS) messaging, Multimedia Message Service (MMS) messaging, text chat, and video chat between users.

In situations in which the systems discussed herein collect personal information about users, or may make use of personal information, the users may be provided with an opportunity to control whether the content sharing platform 120 can collect user information (e.g., information about a user's social network, social actions or activities, profession, a user's preferences, or a user's current location), or to control whether and/or how to receive content from a content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

In some implementations, the content sharing platform 120 may comprise a playlist data store manager 125 and a playlist data provider 130. The playlist data provider 130 may provide playlists for presentation to users and allow users to share playlist information with others. The playlist data provider 130 may cause a media item selected from a playlist to be played and the associated playlist to be also presented to the user on the user's client device 110. The media item currently being played may be highlighted or similarly indicated as selected in the presented playlist, signifying the position of the media item in the playlist.

The playlist data store manager 125 may create and modify playlists. The playlist data store manager 125 may be communicatively coupled to the playlist data store 107 to retrieve and store information relating to playlist data structures. A playlist data structure may be, for example, a table or a file for storing properties of a playlist, as will be discussed in more detail below. When a user requests to add a media item to a playlist, the user may provide a media item identifier and a playlist identifier. The playlist data store manager 125 may query the playlist data store 107 to determine whether the playlist identifier is associated with an existing playlist data structure. If the playlist identifier is associated with the existing playlist data structure, the playlist data store manager 125 may add an entry for the media item into the data structure. Alternatively, if the playlist identifier is not associated with an existing playlist data structure, the playlist data store manager 125 may inform the user that a playlist does not exist and ask the user if he/she would like to create a new playlist. If so, the playlist data store manager 125 may create a playlist data structure for a new playlist and populate it with playlist data provided by the user.

FIG. 2A illustrates an example playlist data structure, in accordance with some embodiments of this disclosure. As discussed above, playlist data structures (e.g. playlist tables) can be stored in the playlist data store 107. The playlist data store manager 125 may add and modify playlist data structures (e.g., in response to a user request).

When a new video is requested to be added to a playlist, the playlist data store manager 125 may add a new entry to a playlist table 200, including a video identifier (video_id) 208, a playlist identifier 204, and a video position in the playlist (index_ID) 216. The video identifier 208 may be an address (e.g., URL) of the video or another identifier assigned to the video when the video is created and/or uploaded to the content sharing platform 120. The playlist identifier 204 is a unique identifier of the playlist, which may be a random number or a sequential number generated by the content sharing platform 125 when the playlist is created. The position 216 of the video in the playlist may be specified by the user.

Concatenating the video identifier 206 and the playlist identifier 204 may not provide sufficient information for determining the current position of the video in the playlist if the playlist includes multiple instances (e.g., clips or copies) of the same video. In addition, combining the playlist identifier 204 and the video position 216 in the playlist may not be sufficient because videos can be inserted or removed from the entries of the playlist before the desired video entry. Further, combining the position of the video in the playlist together with the playlist identifier and video identifier may not be sufficient because entries in the playlists can be modified. Aspects of the present disclosure use a playlist key to provide sufficient information about the video and the current position of the video in the playlist. In addition, with playlist keys, the content sharing platform 120 can gain better rankings in search by having its content indexed several times instead of just once.

In some implementations, when the data store manager 12 creates a new entry for the media item in the playlist table 200, it generates the playlist key 202 that uniquely identifies the media item in the playlist table 200. The playlist key 202 can be generated by counting the total number of media items that have ever been added to the playlist before the present media item and incrementing this number by one. Alternatively, there can be a variety of other ways to generate a unique playlist key. For example, the playlist key can be a random or pseudo random number or a combination of the video instance identifier and the position of the video in the playlist. The playlist key 202 combined with the playlist identifier 204 can be a globally unique identifier to uniquely identify the media item across media items of all existing playlists maintained by the content sharing platform 120.

The use of a playlist key provides sufficient information about the current position of the video in the playlist. For example, given a list of videos A, B and C, the playlist keys of videos A, B, and C are 1, 2 and 3 respectively. If video B is removed from the playlist, then its entry is deactivated in the playlist table, and the playlist keys of videos A and C are still 1 and 3 respectively. If video D is added at position 2 (Index_ID=2) in the playlist, then the playlist includes videos A, D and C and the playlist keys are 1, 4 and 3, respectively.

The playlist table 200 may also include fields such as a user identification (the playlist owner) 206, the type 210 of media item (e.g., movie, clip, image, song, etc.), the time 212 when the media item was created and/or added to the playlist, the status 218 of the entry indicating whether the entry for the media item is active (the media item is currently part of the playlist) or inactive (the media item is no longer part of the playlist) in the playlist table 200, the title of the video, a description of the video, and/or any flags associated with the video.

The playlist data store manager 125 may modify or deactivate entries in a playlist, in accordance with some embodiments of this disclosure. A user may wish to delete or change information about a media item in the playlist. When a user requests to delete a media item from the playlist, the playlist data store manager 125 may deactivate the entry associated with the media item in the playlist table 200. Similarly, if a user wishes to change information about a media item, such as the position of the media item in the playlist, the playlist data store manager 125 may change that information in an entry associated with that media item.

The playlist data provider 130 may use information in the playlist table 200 to allow a user to share a media item in the context of an associated playlist with another person. For example, if a user decides to share a media item from a playlist, a media item identifier, a playlist identifier and the media item position in the playlist can be used to generate a globally unique key to be shared. A playlist identifier, a media item identifier and a playlist key can be combined into a global unique key through, for example, cryptography, simple concatenation, or a lookup table.

In some implementations, the globally unique key may be included in a canonical URL. A canonical URL is a preferred URL from multiple URLs when the same content can be accessed by the multiple URLs. When a user selects a media item from a currently presented playlist for playback, a canonical URL can be generated and displayed in a web address portion of the GUI when the selected media item is played and/or presented to the user (e.g., in a media player portion of the GUI). The canonical URL can include a globally unique key for the selected media item using a playlist identifier 204, a media item identifier 208 and a playlist key 202 from a corresponding entry in the playlist table 200.

If the user requests to share the selected media item on one or more third party platforms 140, the canonical URL can be passed to these platforms, which can then cause the canonical URLs to be included in posts presented by those platforms (e.g., in news feeds of the user's friends or contacts). Subsequently, if the user's friend or contact selects this canonical URL, the canonical URL can be provided to the content sharing platform 120, which can then use the globally unique key included in the canonical URL to provide the shared media item and the playlist for presentation to the user's friend or contact. In particular, the URL parameters in the canonical URL can be used to obtain the video and present it with the playlist, reflecting the position of the video in the playlist. If the video is no longer part of the playlist or if the playlist no longer exists, the video can be presented by itself (without the playlist). The use of canonical URLs with globally unique keys allows the original content that they represent to be changed at any time without having to change the canonical URLs.

Figure 2B:
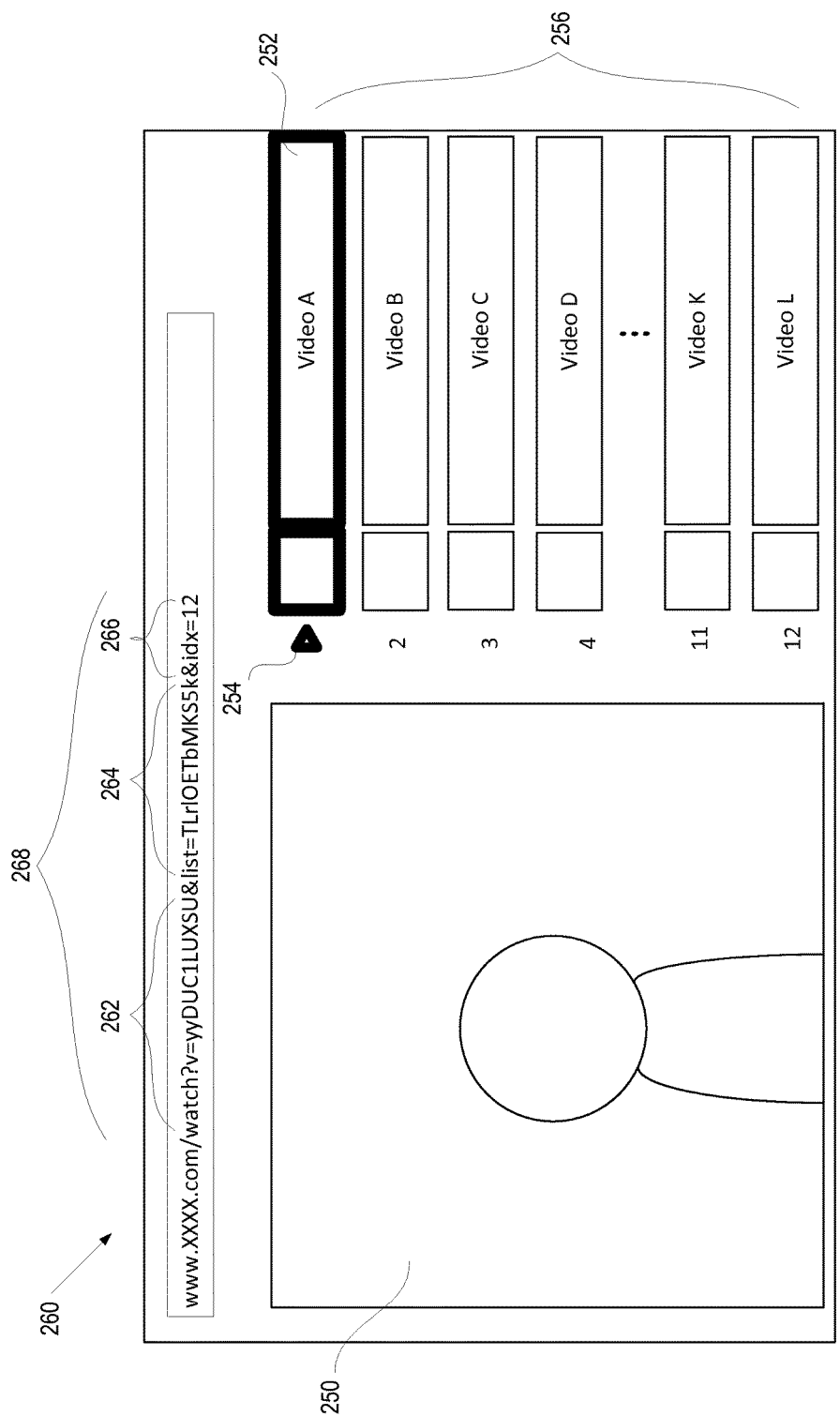
FIG. 2B illustrates an example graphical user interface for presenting videos of a playlist, in accordance with some implementations.

FIG. 2B illustrates an example graphical user interface (GUI) 260, in accordance with some implementations. The GUI presents video A 250 in a media player and a playlist 256 next to the media player. Video A is selected from the playlist 256 that includes items representing respective videos A through L. Each item may include a thumbnail image of a respective video and the title and/or a brief description of the respective video. Item 252 representing video A 250 is highlighted to visually illustrate that it is currently presented in the media player. In addition, an indicator 254 is displayed next to item 252 to further illustrate that the respective video A is currently being played. The web address portion of the GUI 260 presents a canonical URL that includes a globally unique key 268. The globally unique key 268 is constructed using the contents of an entry for the video 250 in the playlist table of the playlist 256. The globally unique key 268 includes a video identifier 262, a playlist identifier 264, and a playlist key 266. Playlist key 266 (idx=12) indicates that even though video 250 is positioned first in the playlist 256, video 250 was the twelfth video added to the playlist.

If the user requests to share video 250 (e.g., to a social network), the canonical URL is passed to these platforms, which then cause the canonical URLs to be included in posts presented by the social network. Alternatively, the canonical URL may not be displayed in the GUI 260 but rather stored locally during the presentation of the video 250 and used as discussed above if the user requests to share the video 250.

Subsequently, if the user's friend or contact selects the canonical URL of the video 250 from a respective post, the canonical URL is provided to the content sharing platform 120, which then uses the global unique key 268 included in the canonical URL to present the video 250 in the context of the associated playlist 256 to the user's friend or contact. In particular, if the video 260 is still part of the playlist 256, the user's friend or contact should see the video 260 in the media player, the playlist 256 next to the media player, and the highlighted (or otherwise graphically illustrated) position of the video 260 in the playlist 256.

Figure 3:
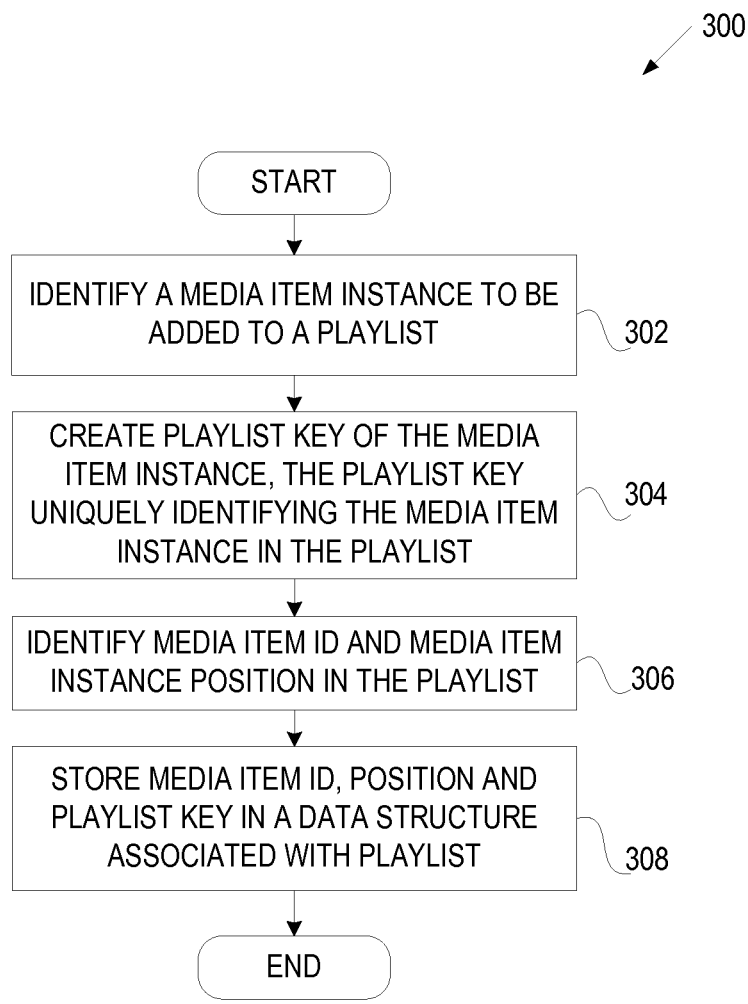
FIG. 3 is a flow diagram of a method for adding a media item instance to a playlist, in accordance with some implementations.
Figure 4:
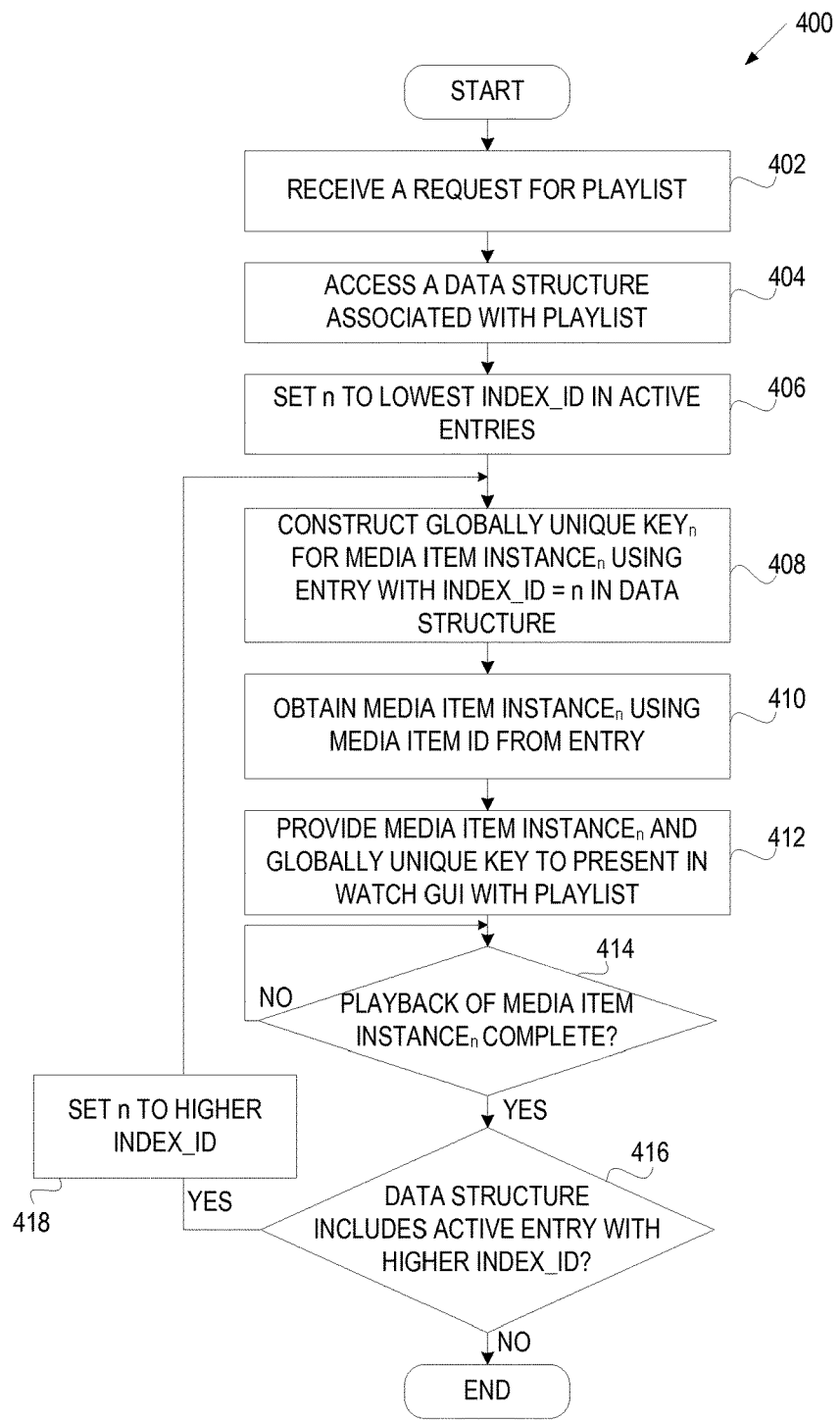
FIG. 4 is a flow diagram of a method for presenting videos of a playlist, in accordance with some implementations.
Figure 5:
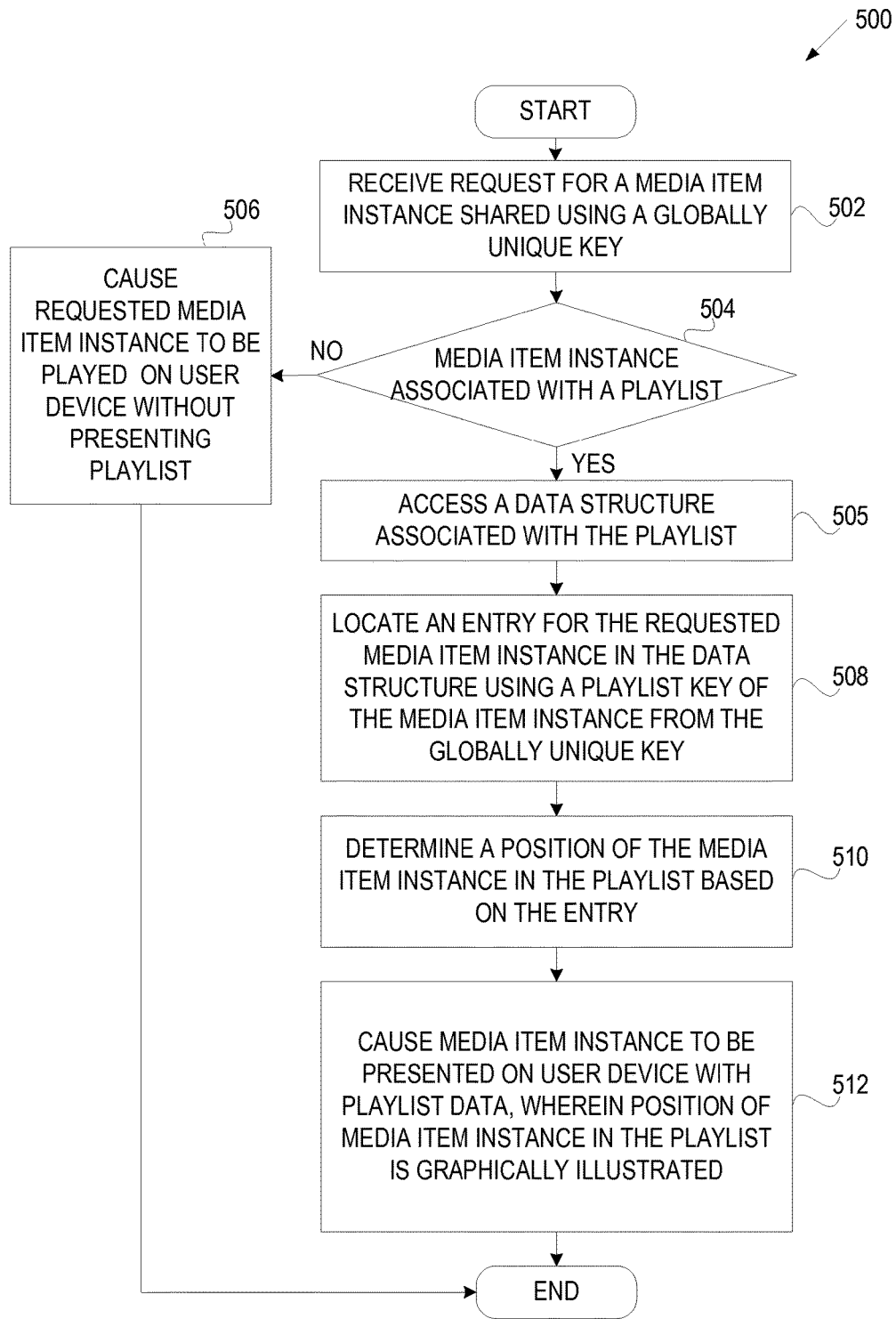
FIG. 5 is a flow diagram of a method for presenting a shared video in the context of a corresponding playlist, in accordance with some implementations.

FIGS. 3, 4 and 5 are example methods performed in accordance with various aspects of the present disclosure. The methods may be performed by processing logic that comprises hardware (e.g., circuitry, dedicated logic, programmable logic, microcode, etc.), software (e.g., instructions run on a processing device to perform hardware simulation), or a combination thereof. For example, the methods may be performed by the content-sharing platform 120 of FIG. 1.

For simplicity of explanation, the methods are is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program, including a set of instructions, accessible from any non-transitory, tangible computer-readable device or storage medium.

FIG. 3 is a flow diagram of a method for adding a media item instance to a playlist, in accordance with some aspects of the present disclosure. At block 302, processing logic identifies a media item instance (e.g., a specific copy or version of a video) to be added to a playlist. A user may have requested to add the media item to a current playlist or may have requested to have a playlist generated beginning with this media item instance. The request can be received by the content sharing platform 120 from a client device 110 of a user. If user has not selected a playlist to add the media item to, the playlist data store manager may ask the user if he/she would like to create a playlist, and if so, the playlist data store manager can create a playlist identifier for the playlist and a playlist data structure (e.g., a playlist table) for the playlist.

At block 304, processing logic creates a playlist key for the requested media item instance that uniquely identifies the media item within the playlist. For example, if this video is the first video to be added to a playlist, the playlist key can have the value of 1. In a further example, if the user adds the $20^{th}$ video to the playlist, the video will have a playlist key of $20^{th}$ video of 20. Moreover, if the user wishes the $20^{th}$ video to be played second in the playlist, the playlist key can still have the value of 20, but the playlist position field in the playlist data structure can include the value of 2.

At block 306, processing logic identifies the position of the media item instance in the playlist (based on user input), a media item identifier of the media item instance (e.g., an identifier of a video associated with the video instance which may be a copy or version of the video), and optionally additional information about the media item instance (e.g., the owner of the media item instance, the type of the media item instance, the time when the media item instance was created or added to the playlist data structure, etc.). At block 308, processing logic stores the above information about the media item instance in a new entry of the playlist data structure. In some implementations, processing logic also creates a globally unique key for the media item instance using the media item identifier of the media item instance, the playlist identifier, and the playlist key, and stores the globally unique key in the playlist data structure. Alternatively, the globally unique key is not stored in the playlist data structure but rather created on the fly when the media item instance is presented to the user with the playlist.

Each time a new media item instance is added to the playlist data structure, a new entry is added to the data structure and a video identifier, a playlist key, and a media item instance position in the playlist are stored in that entry. As media item instances are added to or removed from the playlist, entries in the playlist data structure are activated and deactivated, respectively. When a media item instance is deactivated, the positions of subsequent media items in the playlist change dynamically, without requiring the user to manually change those positions. If a user adds a new media item instance at the playlist position of the previously removed media item instance, the positions of the subsequent media items in the playlist change dynamically again, without any user input for updating those positions.

When a user requests to view the playlist, the playlist data structure associated with the playlist is accessed by the playlist data store manager 107. The playlist is provided to the user for presentation using the contents of the playlist data structure associated with the playlist. The order in which the media items are represented in the playlist is dependent on the position values and the status in respective entries in the playlist data structure. While the playlist is presented on the user device, the media items from the playlist are sequentially streamed to the user device.

FIG. 4 is a flow diagram of a method 400 for playing videos of a playlist, in accordance with some aspects of this disclosure. At block 402, a request for a playlist is received. The request may include the name or identifier of the playlist. The request may be received by the content sharing platform 120 from a client device 110 of a user.

At block 404, processing logic accesses a playlist data structure associated with the playlist to obtain playlist data and provides the playlist data to the user device for presentation in a watch GUI. In some implementations, the playlist data includes thumbnail images and titles and/or brief descriptions of media item instances that are stored in "active" entries of the playlist data structure. A watch GUI (e.g., a watch page or watch UI of a mobile app) may refer to a GUI that includes a media player to play a media item and other areas to provide additional information pertaining to the media item such as its title, brief description, user comments, likes/dislikes, number of views, recommendations of related media items, media item sharing information, etc.

At block 406, "n" representing a media item instance position (Index_ID) is set to the lowest Index_ID number in active entries of the playlist data structure, indicating the media item instance selected from the playlist to play first. At block 408, a globally unique key is obtained or constructed for the selected media item instance using contents of the playlist data structure entry with the lowest Index_ID. At block 410, the media item instance is obtained using the media item identifier of the media item instance from the above playlist data structure entry.

At block 412, the selected media item instance and its globally unique key are provided to the user device for presentation in the watch GUI. The watch GUI can include a media player to play the selected media item instance. In addition, the watch GUI can present the playlist data with the highlighted item representing the selected media item instance, and can also present a canonical URL including the globally unique key of the selected media item instance. An example watch GUI is discussed in more detail above in conjunction with FIG. 2B.

When the playback of the first media item instance is completed (or is about to be completed) (block 414), processing logic determines whether the playlist data structure includes any active entries with Index_ID higher than Index_ID of the selected media item instance (block 416). For example, processing logic can sort active entries of the playlist data structure in descending order and select the active entry immediately following the entry of the selected media item instance. If the playlist data structure does not include any active entries with Index_ID higher than Index_ID of the selected media item instance, method 400 ends. Otherwise, processing logic sets n to the next lowest Index_ID from the remaining active entries (block 418) and returns to block 408. Operations 408 through 418 can be repeated until playback of all media item instances in the playlist concludes or until an occurrence of a certain event (e.g., a user action to move away from the watch GUI or to stop the presentation of the playlist).

A user may want to share the video with others (e.g., via an email message, a text message, a social network, etc.), which would cause the canonical URL to be presented in a social network graphical user interface ("GUI"), email message, text message, etc., in accordance with some implementations. When a viewer activates the canonical URL, the URL parameters in the canonical URL can be used to obtain the media item instance and present it with the playlist, reflecting the position of the video in the playlist. If the media item is no longer part of the playlist or if the playlist no longer exists, the video can be presented by itself (without the playlist).

FIG. 5 is a flow diagram 500 of a method for presenting a shared video in the context of a corresponding playlist, in accordance with some aspects of the present disclosure. At block 502, processing logic receives a request for a media item instance shared using a globally unique key. The request may include the globally unique key, which can be in the form of a canonical URL. At block 504, processing logic can determine whether the media item is associated with a playlist. For example, processing logic can first determine whether the playlist is still active using the playlist ID from the globally unique key of the shared media item instance. If not, processing logic proceeds to block 506. If so, processing logic can use the playlist key from the globally unique key of the shared media item instance to further determine whether a corresponding entry is still active in the playlist data structure. If the corresponding entry is no longer active in the playlist data structure, processing logic proceeds to block 506 to cause the requested media item instance to be played on the user device without presenting the playlist.

If the corresponding entry is still active in the playlist data structure, processing logic can access the data structure of the playlist (block 505) and locate an entry for the requested media item instance in the data structure using the playlist key from the globally unique key of the media item instance (block 508). At block 510, the position of the media item instance in the playlist is determined using the value of the position field (Index_ID) in the entry. At block 512, processing logic causes the media item instance to be presented on the user device together with the playlist and also causes the position of the media item instance in the playlist to be visually illustrated (e.g., by highlighting the playlist item corresponding to the media item instance and/or by presenting a dedicated graphical indicator next to this playlist item).

Figure 6:
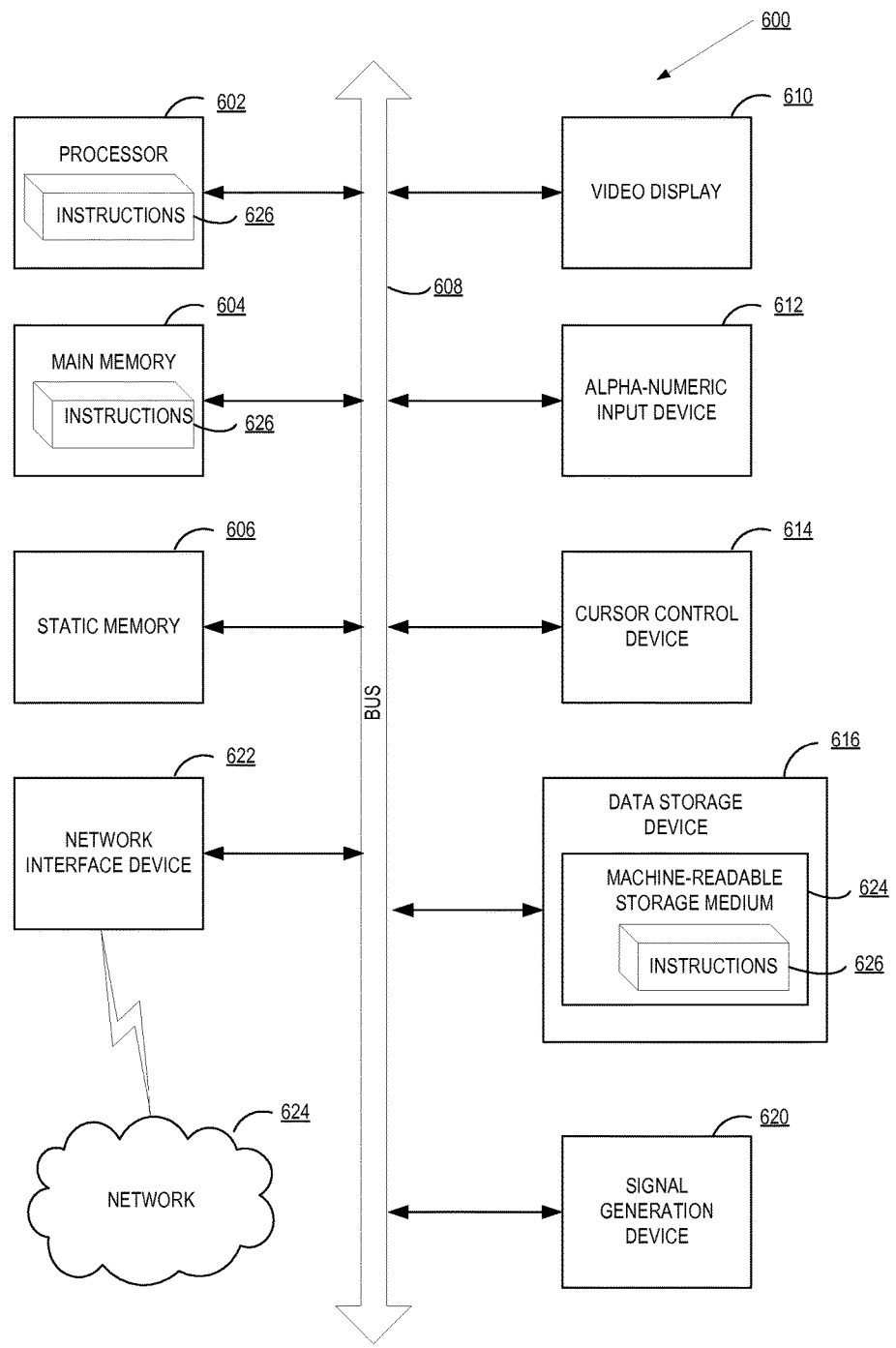
FIG. 6 is a block diagram of an example computer system that may perform one or more of the operations described herein, in accordance with various implementations.

FIG. 6 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608. Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and blocks discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions 626 (e.g., components of content sharing platform 120) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 624 via the network interface device 622.

While the computer-readable storage medium 624 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of blocks leading to a desired result. The blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
identifying, by a processing device, a first media item instance to be added to a playlist, wherein the first media item instance is a first instance of a media item and the playlist comprises a second media item instance, which is a second instance of the same media item;
creating, by the processing device, a first playlist key of the first media item instance, the first playlist key uniquely identifying the first media item instance in the playlist and being different from a second playlist key of the second media item instance;
storing the first playlist key of the first media item instance, an identifier of the media item and an identifier of the playlist in a data structure associated with the playlist, wherein the first playlist key, the identifier of the media item and the identifier of the playlist represent a globally unique key of the first media item instance, wherein the data structure associated with the playlist further includes a position of the first media item instance in the playlist;
receiving a request to share the first media instance with one or more users of a third party platform, the request comprising the globally unique key of the first media instance; and
upon receiving the request to share the first media instance with the one or more users of the third party platform:
obtaining (a) the first media instance item using the identifier of the media item in the globally unique key, (b) the information about the playlist using the identifier of the playlist in the globally unique key, and (c) a position of the first media item instance in the playlist using the first playlist key; and
providing, to the third party platform, the first media instance item and the information about the playlist for presentation of the first media item instance on the third party platform together with the information about the playlist, wherein the position of the first media item instance in the playlist is visually illustrated during the presentation.

2. The method of claim 1 wherein the first playlist key of the first media item instance indicates a number of other media item instances added to the playlist prior to the first media item instance.

3. The method of claim 1 further comprising creating the globally unique key of the first media item instance by cryptographically combining or concatenating the first playlist key of the first media item instance, the identifier of the first media item instance and the identifier of the playlist.

4. The method of claim 3 wherein storing the globally unique key of the first media item instance comprises adding an entry for the first media item instance to the data structure, the entry comprising the globally unique key of the first media item instance.

5. The method of claim 4 wherein the entry for the first media item instance further comprises additional information about the first media item instance, the additional information comprising the position of the first media item instance in the playlist.

6. The method of claim 4 further comprising:
receiving a user request to remove the first media item instance from the playlist; and
deactivating the entry for the first media item instance in the data structure.

7. The method of claim 5 further comprising:
receiving a user request to view the playlist;
accessing the data structure associated with the playlist; and
providing the playlist for presentation to a user using the data structure associated with the playlist, wherein when the playlist is presented on the user device, an order of current media items in the playlist is defined based on position values in respective entries of the data structure.

8. The method of claim 7 wherein providing the playlist for presentation to the user comprises:
sequentially streaming the current media items of the playlist to a user device.

9. The method of claim 8 further comprising:
causing a position of a current media item presented on the user device to be graphically illustrated in the playlist.

10. A computer-implemented method comprising:
receiving, by a processing device of a content sharing platform, a request for a first media item instance shared using a globally unique key of the shared first media item instance, the shared first media item instance being a first instance of a media item, wherein the first media item instance is hosted by the content sharing platform and is shared with one or more users of a third party platform that is separate from the content sharing platform;
responsive to the request for the shared first media item instance, determining, based on the globally unique key of the shared first media item instance, whether the shared first media item instance is associated with a playlist;
upon determining that the shared first media item instance is associated with the playlist:
accessing a data structure associated with the playlist to obtain information about the playlist, the playlist comprising a second media item instance, which is a second instance of the media item;
locating an entry for the shared first media item instance in the data structure using the globally unique key;
determining, using the entry, a position of the shared first media item instance in the playlist; and
providing, to the third party platform, the shared first media item instance and the information about the playlist for presentation of the first media item instance on the third party platform together with the playlist, wherein the position of the shared first media item instance in the playlist is visually illustrated during the presentation.

11. The method of claim 10, wherein upon determining, based on the globally unique key of the shared first media item instance, that the shared first media item instance is not associated with the playlist, causing the shared first media item instance to be presented on the third party platform without presenting the playlist.

12. The method of claim 10, wherein determining whether the shared first media item instance is associated with the playlist, comprises parsing the globally unique key to obtain a playlist identifier of the playlist.

13. The method of claim 10, wherein the position of the shared first media item instance in the playlist is visually illustrated using at least one of a visual indicator or highlighting of the shared first media item instance in the playlist.

14. The method of claim 10, wherein the data structure comprises entries for multiple media item instances associated with a same media item.

15. The method of claim 10, wherein the globally unique key comprises an identifier of the media item of the shared media item instance, a playlist key of the shared first media item instance, and an identifier of the playlist.

16. The method of claim 15, wherein the playlist key of the shared first media item instance, the identifier of the media item and the identifier of the playlist are cryptographically combined or concatenated to produce the globally unique key.

17. The method of claim 10, wherein when a playback of the shared first media item instance has concluded, automatically causing the second media item instance from the playlist to be played on the user device and causing the position of the second media item instance to be visually illustrated in the playlist, the second media item instance immediately following the shared first media item instance in the playlist.

18. The method of claim 10, wherein the position of the shared first media item instance in the playlist is determined using the entry for the shared first media item instance in the data structure.

19. A system comprising:
a memory; and
a processing device, coupled to the memory, to:
receive, by a content sharing platform, a request for a first media item instance shared using a globally unique key of the shared first media item instance, the shared first media item instance being a first instance of a media item, wherein the first media item instance is hosted by the content sharing platform and is shared with one or more users of a third party platform that is separate from the content sharing platform;
responsive to the request for the shared first media item instance, determine, based on the globally unique key of the shared first media item instance, whether the shared first media item instance is associated with a playlist;
upon determining that the shared first media item instance is associated with the playlist:
access a data structure associated with the playlist to obtain information about the playlist, the playlist comprising a second media item instance, which is a second instance of the media item;
locate an entry for the shared first media item instance in the data structure using the globally unique key;
determine, using the entry, a position of the shared first media item instance in the playlist; and
provide, to the third party platform, the shared first media item instance and the information about the playlist for presentation of the first media item instance on the third party platform together with the playlist, wherein the position of the shared first media item instance in the playlist is visually illustrated during the presentation.

20. A non-transitory computer-readable storage medium storing instructions that, when executed by a processing device, cause the processing device to perform operations comprising:
receiving, by a content sharing platform, a request for a first media item instance shared using a globally unique key of the shared first media item instance, the shared first media item instance being a first instance of a media item, wherein the first media item instance is hosted by the content sharing platform and is shared with one or more users of a third party platform that is separate from the content sharing platform;
responsive to the request for the shared first media item instance, determining, based on the globally unique key of the shared first media item instance, whether the shared first media item instance is associated with a playlist;
upon determining that the shared first media item instance is associated with the playlist:
accessing a data structure associated with the playlist to obtain information about the playlist, the playlist comprising a second media item instance, which is a second instance of the media item;
locating an entry for the shared first media item instance in the data structure using the globally unique key;
determining, using the entry, a position of the shared first media item instance in the playlist; and
providing, to the third party platform, the shared first media item instance and the information about the playlist for presentation of the first media item instance on the third party platform together with the playlist, wherein the position of the shared first media item instance in the playlist is visually illustrated during the presentation.

* * * * *